Oct. 16, 1945.    J. W. HOFFECKER    2,386,796
EXTRUDING DEVICE
Filed Aug. 5, 1942
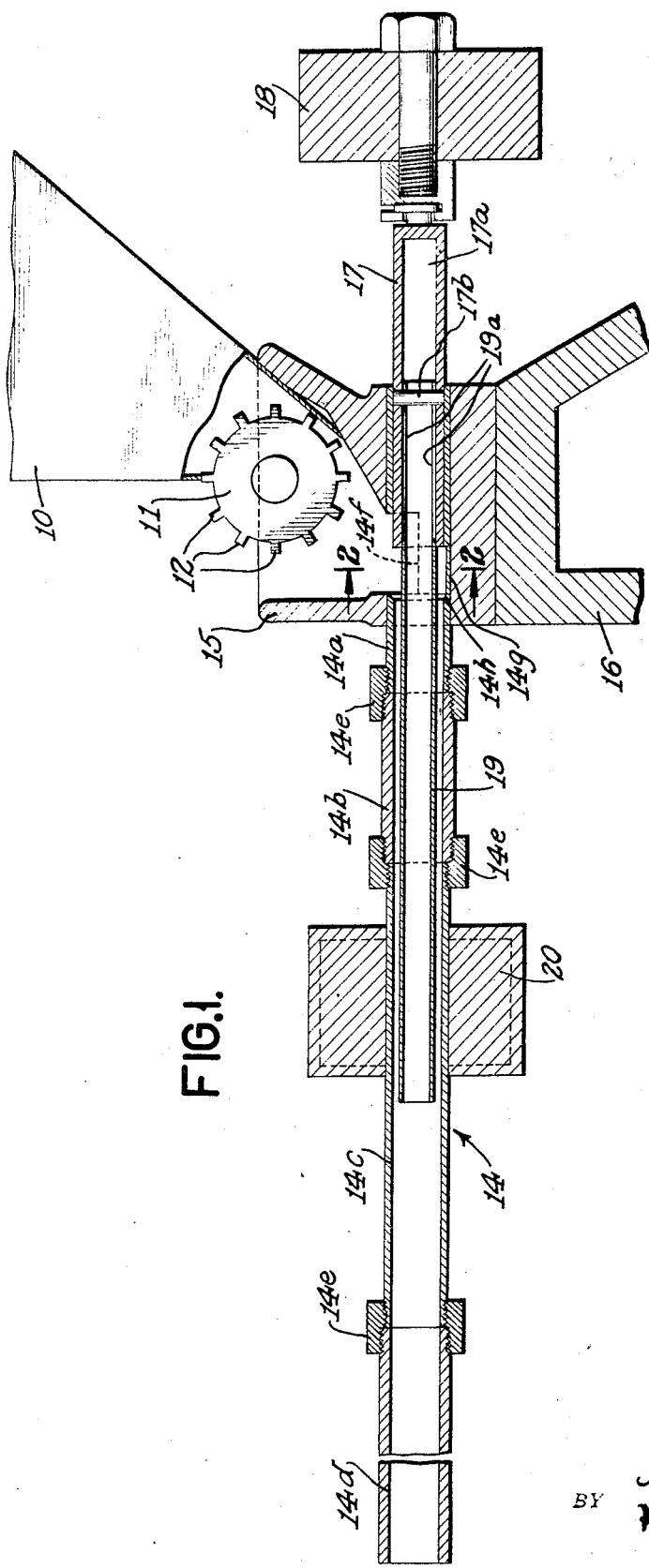
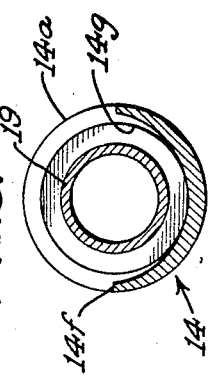
INVENTOR.
J. WESLEY HOFFECKER
BY Huguet, Neary & Campbell
His ATTORNEYS Patented Oct. 16, 1945

2,386,796

UNITED STATES PATENT OFFICE 2,386,796

EXTRUDING DEVICE

John Wesley Hoffecker, Wilmington, Del., assignor to Bond Crown & Cork Co., a corporation of Delaware Application August 5, 1942, Serial No. 453,644

4 Claims. (Cl. 18—14)

This invention relates to improvements in extruding devices and relates particularly to improvements in the feeding mechanisms of devices for extruding and shaping comminuted material, such as ground cork to which a binder has been added, into sheets, rods and tubes.

Typical extruding devices of the type referred to above are disclosed in the United States patents to Bond No. 1,453,617 and Edmonds No. 2,143,549. These devices include a hopper for delivering the comminuted material into an extrusion die or tube where the material is compacted and advanced by means of a reciprocating plunger. Steam or water jackets or other heating elements usually are mounted on the tube for applying heat to cause the binder to harden or set. When tubular articles are to be extruded, a mandrel is positioned in the tube so as to define an annular space through which the material is extruded.

Devices of the type described operate satisfactorily to produce solid articles or bodies having walls of substantial thickness. However, when thin-walled hollow articles are to be produced, considerable difficulty has been encountered in making the walls of the articles uniform in density and strength. It appears that the mandrel prevents free and uniform distribution of the comminuted material around the mandrel at the feed end of the tube. As a result, some portions of the walls of the article contain less material than other portions making the density of the walls non-uniform with the result that the less dense portions of the article may have a tendency to split or may be less effective for sealing purposes when the tubular product is used to form sealing gaskets, cushion liners for crown caps and for similar purposes.

An object of the present invention is to provide a device which overcomes the disadvantages of the prior extrusion devices set forth above.

Another object of the invention is to provide a device for making thin-walled, tubular bodies of composition cork and similar materials having walls of substantially uniform density and strength.

A further object of the invention is to provide a device in which comminuted material is fed uniformly to all portions of an extrusion tube so that an extruded product of uniform strength and density is obtained.

Other objects of the invention will be apparent from the disclosure hereinafter of typical forms of devices embodying the present invention.

In accordance with the present invention, I have provided an extrusion device for making rods or tubes from moldable materials such as comminuted cork admixed with a binder in which means is provided for distributing and feeding the material uniformly to an extruding die in advance of a compacting and feeding ram or plunger in order to obtain a compacted extruded article of uniform strength and density. More particularly, I have provided a feeding means for delivering comminuted materials substantially equally to all sides of the mandrel of a tube extruding device so that the walls of the extruded tubes are of uniform density and strength.

For a better understanding of the present invention, reference may be had to the accompanying drawing in which:

Figure 1 is a view in vertical longitudinal section of a typical form of extruding device embodying the present invention;

Figure 2 is a view in cross-section taken on line 2—2 of Figure 1; and

Figure 3 is a view in cross-section of a modified form of feeding chamber embodying the present invention.

The form of device selected for illustration of the present invention, as shown in Figures 1 to 3, may be used for forming hollow bodies or tubes out of such moldable materials as comminuted cork containing a binder which is set, by the application of heat, to form a self-sustaining article.

The apparatus illustrated in the drawing includes a hopper 10 for receiving the ground cork and the binder mixed therewith, and a feeding mechanism consisting of a roll 11 at the bottom of the hopper which is provided with a plurality of radially extending fingers 12 for feeding the ground cork from the hopper.

An elongated tube or extrusion die 14 has one end fixed in an open top casing 15 which is disposed beneath the feed hopper 10 and receives the feed roll 11 therein. The casing 15 is supported on a suitable framework 16 and the end of the extrusion tube 14, which extends therefrom, may be supported in any suitable way so as to prevent it from bending or flexing.

The tube 14, as illustrated, is made up of a series of sections 14a, 14b, 14c and 14d which are joined by means of suitable threaded collars 14e. The section 14a of the tube 14 preferably is formed of metal, such as brass tubing, and extends entirely through the casing 15 from one side to the other. This section of the tube receives a slidable plunger or ram 17 which is secured to a reciprocating cross-head 18 that is driven in any suitable manner to cause the plunger 17 to reciprocate axially of the section 14a.

The tube section 14a is cut away at 14f throughout substantially one-half of its circumference in order to form an opening through which the comminuted cork may flow, to be engaged by the plunger 17 and forced into and through the tube 14. A device of the type described above is suitable for forming solid cork rods from the comminuted cork and binder mixture described above.

In order to form hollow cork bodies, a mandrel 19 is mountd within the extrusion die 14 and arranged so as to be received in a recess 17a in the plunger with a smooth sliding fit. The mandrel 19 is provided with diametrically spaced slots 19a for receiving a pin 17b extending diametrically across and fixed in the plunger 17. This arrangement permits relative sliding movement between the plunger 17 and the mandrel 19.

Th sections 14b and 14d of the die 14 may be formed of low heat conductive synthetic resin tubing, e. g. Bakelite, while the section 14c may be formed of a highly heat conductive material such as, for example, copper tubing. An electrical heating unit 20 encircles the section 14c of the die for delivering heat to the extruded material to cause the binder to set and thus bond the cork particles together. The synthetic resin section 14b serves to substantially prevent heat transfer from the heating unit 20 along the walls of the section 14c to the section 14a of the die 14 in which the comminuted cork and binder are first received and thus prevents the binder from hardening before the cork has been properly compacted and molded to the desired form. The sections 14a and 14b taken together constitute the forming section of the extrusion passage. The section 14c may be referred to as the heating or "cooking" section, and the section 14d may be referred to as the "soaking" and cooling section. The structure and arrangement of the forming, cooking and cooling sections embody novel features forming the subject of the copending applications of Pendergrast, Serial No. 316,721, now Patent No. 2,335,307, and Pendergrast and Benton, Serial No. 316,722, now Patent 2,335,308, both filed February 1, 1940.

Devices of the type described above are not entirely satisfactory for the production of thinwalled tubing for the reason that the mandrel 19 interferes with the passage of the cork particles into the space beneath the mandrel with the result that the portion of the wall of the cork tubing beneath the mandrel 19 is less dense and weaker than the other portions of the tube.

I have found that this deficiency of the prior art devices may be overcome by milling out or otherwise increasing the internal diameter of the tube section 14a at the feeding zone to provide a larger space for passage of the cork particles thereby obtaining a substantially uniform feed of the material to all parts of the annular passage defined between the mandrel 19 and the tube section 14a. As shown in Figures 1 and 2, the area of the tube section 14a at the inlet end of the nozzle is increased by milling out a portion 14g entirely around the lower section of the tube so that an enlarged space is provided between the mandrel 19 and the portion of the tube 14a underlying and at the sides of the mandrel 19. Also, the left hand edge of the milled out portion 14g as viewed in Figure 1 preferably is provided with a tapered edge 14h which further improves the feeding of the material into the tube 14.

While I prefer to mill out the tube section 14a through its entire lower half, as illustrated in Figure 2, because this simplifies the milling operation, I have found that it is not necessary to do this. As shown in Figure 3, the sides of the tube may be milled out while the bottom remains in the same plane as the remainder of the section 14a. This construction permits uniform feeding of the comminuted material beneath the mandrel 19 and likewise as in the construction of Figure 2 over long periods of operation the comminuted cork will continue to feed uniformly around the mandrel so that tubular members of uniform strength and density are obtained.

The dimensions of the cutout or enlarged portion may be varied considerably. The important thing appears to be to provide spaces at the feed end of the extrusion tube at each side of the path of the ram or plunger that are wide enough to permit portions of the comminuted material that is to be molded to feed down along the sides of the plunger during its forward stroke. This insures that portions of the comminuted particles will be disposed in position to immediately pass downwardly beneath the mandrel as the plunger is retracted in the extrusion operation, and this obviates the tendency toward "bridging" that seems to have been the cause of the nonuniformity of feed met with in the older devices. In these devices the feed to the space beneath the mandrel has to be supplied from the quantity of comminuted material that rests on the top of the plunger during the forward half of the extrusion stroke and falls down about the mandrel as the plunger is retracted. On the other hand, it is undesirable to provide such a large space as to cause a substantial quantity of the material to remain indefinitely in pockets at the sides of the feed end of the tube. The optimum width of the cutout portions will vary somewhat depending on the size of the granular or comminuted particles of material being fed to the die and also on the nature and feeding characteristics of the material. In extruding composition cork tubes through an extrusion die of an internal diameter of one inch, I have found that the cutting away of the walls of the tube to a depth of $\frac{1}{16}$ to $\frac{1}{4}$" either at the sides alone or also along the bottom of the tube at the point of feed will insure a satisfactory feeding operation.

While my improved construction is primarily applicable to devices for forming hollow bodies, it has been found that some improvement in the feeding of comminuted materials to form solid bodies or rods is obtained by increasing the diameter of the feed end of the extrusion tube as described above.

From the preceding description of typical forms of devices embodying the present invention, it will be clear that I have provided a simple and effective means for distributing comminuted materials uniformly to the feed end of an extrusion tube and thus have overcome the drawbacks of prior devices. While the invention has been described with reference to the production of articles from comminuted cork, it will be understood that other moldable materials may be extruded with my device with equal facility and that the shapes and sizes of the extruded articles may be varied widely by suitably shaping the extrusion tube and mandrel without departing from the invention.

Therefore, the form of the invention described above should be considered as illustrative only, and not as limiting the scope of the following claims.

I claim:

1. In an extruding device for extruding material initially in comminuted form having a horizontal extrusion die of substantially uniform internal cross section along its length, a mandrel within and in spaced relation to the walls of said die, a comminuted material-receiving hopper disposed at the feed end of said die, a reciprocable ram alternately slidable into the extrusion passage formed between said mandrel and said die at the feed end of said die and alternately retractable to a position permitting comminuted material disposed in said hopper to feed by gravity to a position where it may be engaged and forced into said extrusion passage during the next forward stroke of said ram; the improvement which comprises means including a confining wall defining with said mandrel passageways at the horizontally opposite sides of said mandrel extending downwardly from the bottom of said hopper adjacent the feed end of said die, said passageways being wider between said mandrel and said confining wall than the wall thickness of said ram, whereby material fed from said hopper to said die will pass freely past said sides of said mandrel and become uniformly distributed in said extrusion passage about said mandrel.

2. In an extruding device for extruding a material initially in comminuted form and having a horizontal extrusion die of substantially uniform internal cross-sectional shape along its length, a mandrel within and in spaced relation to the walls of said die, a comminuted material-receiving hopper disposed adjacent and extending downwardly to the feed end of said die, and a ram reciprocable within the space between said die and said mandrel in the portion thereof adjacent said hopper and adapted to be alternately retracted to permit comminuted material disposed in said hopper to pass by gravity down into position ahead of said ram and advanced to compact material in and force it through the extrusion passage formed between the walls of said die and said mandrel; the improvement which comprises means including a confining wall defining with said mandrel passageways at the horizontally opposite sides of said mandrel at the feed end of said die extending downwardly for material being fed from said hopper to said die, said passageways having a width between said mandrel and said confining wall substantially greater than the width of the annular extrusion passage between the mandrel and the side walls of said die, whereby material fed from said hopper to said die will pass freely past said sides of said mandrel and become uniformly distributed in said extrusion passage about said mandrel.

3. In an extruding device for extruding a material initially in comminuted form having a horizontal, tubular extrusion die of substantially uniform internal diameter along its length provided with a feed opening in a wall thereof adjacent to one end of said die, a mandrel disposed centrally of said die and extending longitudinally thereof from said end, a reciprocable ram slidable in said end of said die between said die and said mandrel beneath said feed opening for advancing material into an along said die, and a hopper for supplying comminuted material to said opening; the improvement which comprises means defining passageways at the horizontally opposite sides of said mandrel extending downwardly from said feed opening formed between the mandrel and the walls of said die and having a width between said mandrel and said walls substantially exceeding the wall thickness of said ram, whereby the feeding of the material downwardly about said mandrel into position to be moved through said die by said ram is facilitated.

4. In an extruding device for extruding a material initially in comminuted form having a horizontal extrusion die of substantially uniform internal cross section along its length, a mandrel within and in spaced relation to the walls of said die, a reciprocable ram alternately slidable into the extrusion passage formed between said mandrel and the walls of said die at the feed end of said die and retractable to a position permitting comminuted material to fall by gravity to a position where it may be engaged and forced into said extrusion passage during the next forward stroke of said ram, and means for feeding said comminuted material to fall into said position for engagement by said ram; the improvement which comprises means including a confining wall defining with said mandrel passageways at the horizontally opposite sides of said mandrel extending downwardly beneath said feeding means, said passageways having a width between said mandrel and said confining wall substantially greater than the annular width of said extrusion passage between said mandrel and the walls of said die.

J. WESLEY HOFFECKER.